No. 749,746. PATENTED JAN. 19, 1904.
R. C. POLLOCK.
DEVICE FOR AUTOMATICALLY PREVENTING ESCAPE OF AIR FROM TRAIN PIPE COUPLINGS.
APPLICATION FILED SEPT. 24, 1903.
NO MODEL.
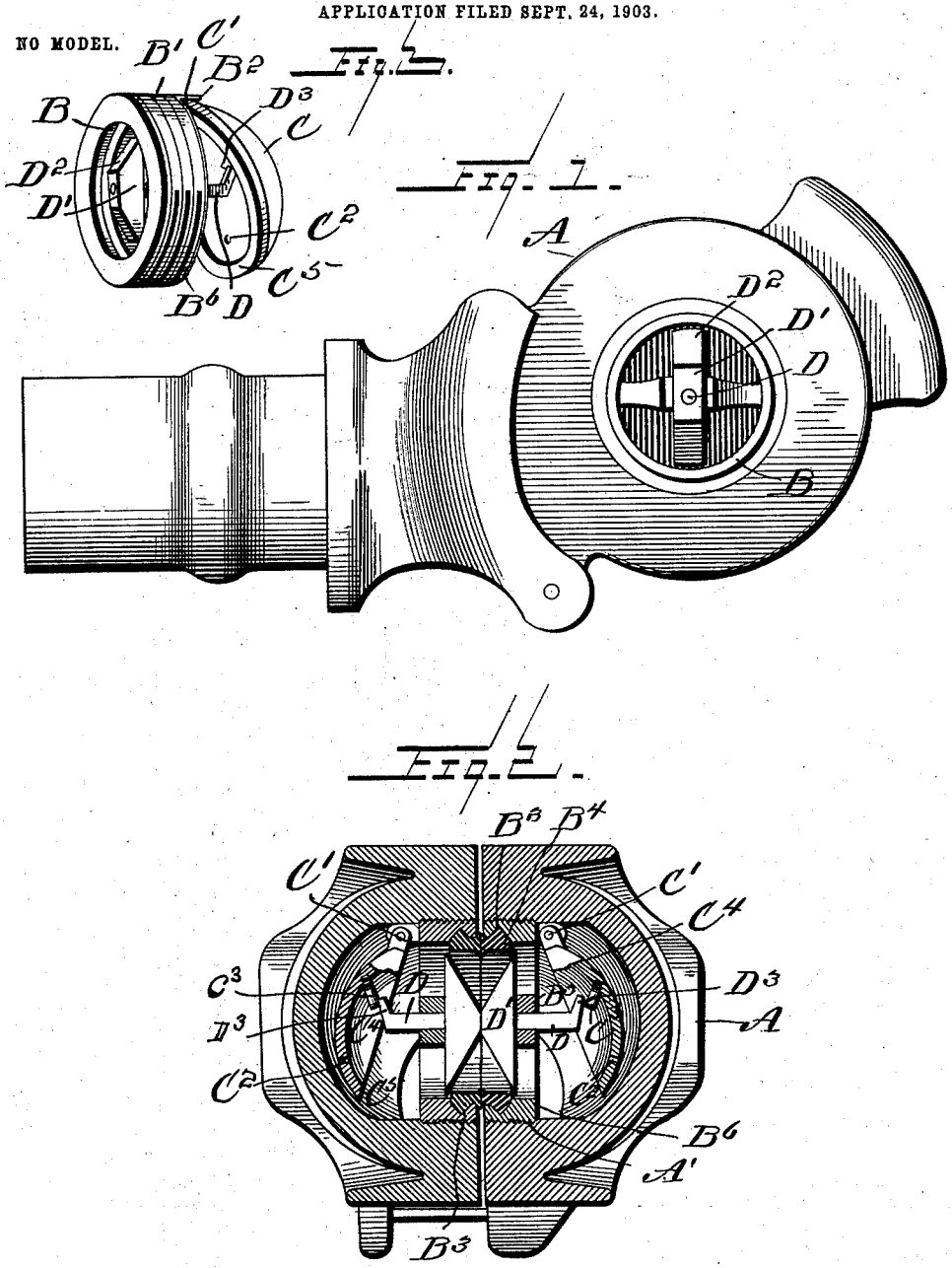
WITNESSES
INVENTOR
Robert C. Pollock.
BY
Franklin H. Hough
Attorney No. 749,746. Patented January 19, 1904.

UNITED STATES PATENT OFFICE.

ROBERT CAREY POLLOCK, OF KINGS BRIDGE, NEW YORK.

DEVICE FOR AUTOMATICALLY PREVENTING ESCAPE OF AIR FROM TRAIN-PIPE COUPLINGS.

SPECIFICATION forming part of Letters Patent No. 749,746, dated January 19, 1904.

Application filed September 24, 1903. Serial No. 174,476. (No model.)

*To all whom it may concern:*

Be it known that I, ROBERT CAREY POLLOCK, a citizen of the United States, residing at Kings Bridge, in the county of New York and State of New York, have invented certain new and useful Improvements in Devices for Automatically Preventing Escape of Air from Train-Pipe Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to train-pipe couplings, and particularly to means for preventing the sudden escape of air from a train-pipe in the event of a break therein.

The invention has for an object to provide a valve or other device adapted to be normally held open when the coupling is assembled and to be automatically closed in the event of the breaking of a coupling, such valve or device having therein a small escape-aperture, so that the breaks controlled by the pipes may be set without a sudden jar, which occurs in the event of the complete escape of air from the pipe.

A further object of the invention is to provide a pivoted and automatically-operating valve having an aperture through the top thereof and coöperating with a push-rod, by which it may be held open when the parts of the couplings are assembled.

Other and further objects and advantages of the invention will be hereinafter set forth, and specifically defined in the appended claims.

In the drawings, Figure 1 is a side elevation of one part of a coupling with the invention applied thereto. Fig. 2 is a central transverse vertical section of a coupling assembled, and Fig. 3 is a detail perspective of the valve device.

Like letters of reference refer to like parts in the several figures of the drawings.

The letter A indicates the train-pipe coupling, which may be of any desired construction or configuration, preferably that in ordinary use, the interior surface thereof at its contacting face being threaded, as at A', to receive the valve-casing B. This casing is exteriorly threaded, as shown at B', and provided at one side with a pivoting-lug $B^2$, upon which a valve C is pivotally mounted, as at C', while the top of the valve is provided with a small vent or escape-opening $C^2$ to permit the escape of air from the train-pipe in the event of the separation of the coupling and the closing of the valve. The casing B is provided at the front portion with an annular groove $B^3$, adapted to contain the usual packing-ring $B^4$, which when the parts are assembled, as shown in Fig. 2, will effect an air-tight joint between the members of the coupling and yet permit a sufficient movement thereof to effect an uncoupling operation and retain the necessary pressure upon the locking-lugs of the coupling. This casing B is also provided with a cross-bar $B^5$, in which a push-rod D is slidingly mounted, and provided at one end with a head D', having opposite beveled faces $D^2$, and at its opposite end with an angularly-disposed finger $D^3$, adapted to contact with the valve or with any suitable projection carried thereby—for instance, the threaded lug $C^3$, mounted upon the inner concaved face of the valve, as shown in Fig. 2. The contact-face $C^5$ of this valve, extending circumferentially thereof, is adapted to engage the face $B^6$ upon the valve-casing, thus effecting an air-tight joint at that point, so that the only escape from the train-pipe system is through the aperture $C^2$.

A specific construction of valve and casing has been herein illustrated and described; but the invention is not confined thereto, as the functions thereof may be attained by a different structure of valve or device having the escape-opening, and therefore changes may be made in the detailed construction and configuration without departing from the spirit of the invention as defined by the appended claims.

In the operation of the invention it will be seen that when the members of the coupling are assembled, as shown in Fig. 2, the push-rod D maintains the valve open, so that a perfect circulation is established throughout the train system. It has been found in the use of heavy trains that in the breaking of a coupling whereby the train becomes separated the broken air-pipe permits an immediate escape of the pressure from the reservoir, thus setting the brakes in a sudden and violent manner, which frequently damages the brake mechanism as well as causes injury to passengers upon the cars. The present invention avoids this objection by permitting a gradual escape of the air from the reservoir through the aperture in the valve, and it will be seen that in the event of a disconnection with the members of the coupling, either by breakage or otherwise, the weight of the valve will close it against its seat, assisted by the air-pressure in the system, so that a gradual escape is only effected, by which the brakes will be smoothly and easily set without jar to the train or damage to the mechanism. In the event of the ordinary breakage in an air-brake system the engineer is without further control of his train; but in the event of the closing of the valve in the present invention a pressure may be reëstablished in the reservoir from the engine-pump, as the capacity of this pump being greater than the aperture will permit the brakes to be released upon that portion of the train still connected with the engine, whereby the engineer is enabled to quickly move his train either for the purpose of recovering the detached cars or otherwise, and loss of time, frequently occurring in the event of such breakage, is materially reduced.

It will be seen that the invention may be applied to the ordinary construction of couplings by simply threading the interior thereof or otherwise applying the casing carrying the safety-valve.

Having described my invention and set forth its merits, what I claim as new, and desire to secure by Letters Patent, is—

1. A train-pipe coupler provided with valve-carrying members adapted to be mounted in coupler-heads, a valve pivotally mounted upon an extended portion of each member and provided with a by-pass, a headed push-rod mounted centrally within each member, each valve being provided with a lug adapted to contact with the end of said push-rod, as set forth.

2. A train-pipe coupling comprising in combination with the coupler-heads, valve-carrying members mounted in the chambered portions of the coupler-heads, a lug projecting from each of said members, a valve pivotally mounted upon said lug, a headed push-rod, the stem of which has a movement through a cross-bar forming a part of said member and having its end turned at an angle, and an inclined lug mounted upon said valve adapted to contact with the free end of said stem, as set forth.

3. A train-pipe coupler comprising in combination with coupler-heads, annular valve-carrying members having threaded connection with the threaded walls of the chambered portions of the coupler-heads, packing-rings seated in annular recesses in said members, lugs projecting at right angles from said members, a valve pivotally mounted upon each of said lugs and provided with a by-pass, a lug projecting from the inner concaved face of each valve, a push-rod having an enlarged tapering-ended head, and a stem with an angled end adapted to contact with said lug upon the valve, as set forth.

4. In a train-pipe coupling, an exteriorly-threaded valve-casing adapted to be threaded therein and provided upon one face with a pivoting lug, a valve pivoted to said lug and adapted to engage the face of said casing and provided with an aperture therethrough, an inwardly-extending projection from the inner face of said valve, a cross-bar in said casing, a push-rod slidably mounted in said cross-bar, a beveled head at one end of said push-rod, and an angularly-disposed finger at the opposite end of said rod adapted to engage the projection upon the inner face of the valve.

In testimony whereof I hereunto affix my signature in presence of two witnesses.

ROBERT CAREY POLLOCK.

Witnesses:
A. O. WHALEY,
JAMES E. HORTON.